Figure 1:
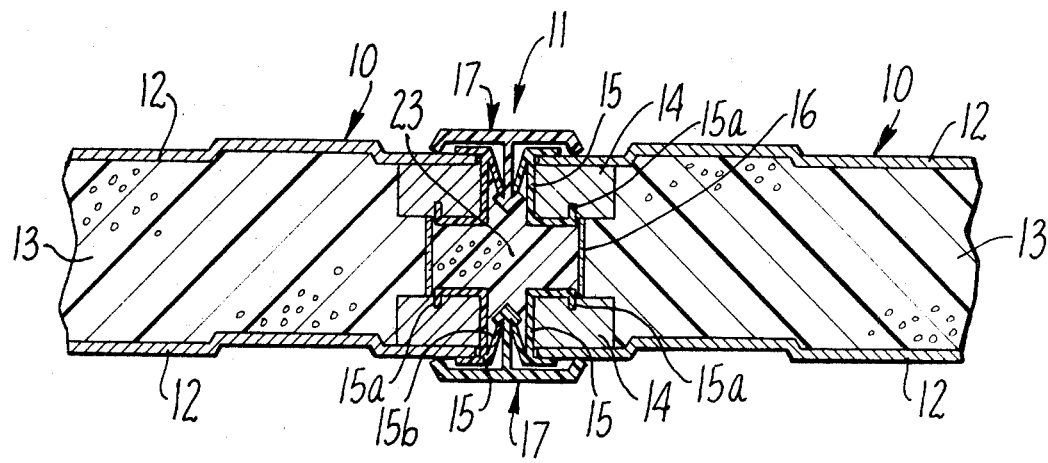

United States Patent

[11] 3,583,118

[72] Inventor William E. Lowery
 Orinda, Calif.
[21] Appl. No. 857,684
[22] Filed Sept. 15, 1969
[45] Patented June 8, 1971
[73] Assignee Control Building Systems, Inc.

[54] INSULATED PANEL STRUCTURES AND CONNECTIONS
 3 Claims, 3 Drawing Figs.
[52] U.S. Cl.................................................. 52/309,
 52/417, 264/45
[51] Int. Cl.................................................. E04b 2/10,
 E04c 2/20
[50] Field of Search........................................ 52/309,
 615, 417, 437, 416, 418, 421; 161/161; 264/45;

[56] References Cited
UNITED STATES PATENTS
3,323,267 6/1967 Fish.............................. 52/309
3,481,642 12/1969 Bonalack....................... 52/309
Primary Examiner—John E. Murtagh
Attorney—Eckhoff and Hoppe ABSTRACT: Insulated panel structures comprising a pair of skins separated by an insulating barrier of foamed-in-place insulating material and having a recessed edge defined in part by a transparent rail which permits observation of the foam-filling process as the insulating material is inserted between the pair of skins.

A connection for joining two insulated panels, each panel having a recessed edge to receive foamed-in-place material therebetween, and comprising a closure batten having a substantially T-shaped cross section, the foamed-in-place material acting upon the batten in cooperation with flexible locking flanges mounted on the edge of each panel to provide a tight seal.

PATENTED JUN 8 1971 3,583,118

INVENTOR.
WILLIAM E. LOWERY
BY Ernest M Anderson
ATTORNEY

INSULATED PANEL STRUCTURES AND CONNECTIONS

This invention generally relates to the manufacture and construction of insulated panels, particularly those panels which comprise a pair of skins separated by a thermal barrier of foamed-in-place insulating material, and to connections for joining two such panels in edge-to-edge relation.

The manufacture of sandwich-type insulating panels, such as those produced by inserting an insulating foam between two faces or skins, present two basic problems. One of these problems is the need to contain the foam around the edges of the panel with a barrier which is strong enough to resist the outward foaming pressure. The second basic problem is the need to fill the cavity between the skins without leaving any voids.

Conventional insulated panel structures of the kind described are usually formed with foaming pressures in the range between 4 and 10 p.s.i. It is for this reason that some mechanical means must be used to resist the outward foaming pressure. The most common means for resisting this pressure comprises side rails made of steel or aluminum. The foamed-in-place material is then inserted between two skins by means of a probe that is inserted through holes or openings drilled through the side rails. While these side rails adequately control the foaming pressure, special equipment must be used to break the bond that is formed between the rails and the foaming material. Moreover, the use of such rails provides no means for detecting possible voids within the panel—either during the process of foaming or after the foam has taken a set.

The present invention provides a solution to both of the above-described problems. In this connection there is provided a clear, transparent side rail which may be made of clear polyvinyl chloride. The rail is held in place along the edges and ends of the panel by rigid members attached to the skins, and the rails thereafter become an integral part of the structure.

This invention further teaches a novel connection for joining two such insulated panels together with a foamed-in-place joint. In particular, the connections of this invention provide an economical solution to the problem of closing off a joint so completely as to eliminate any cracks or fissures which might harbor dirt or insects while also forming a homogenous layer of insulation in the joint between two connected panels.

In brief, the present invention in a panel connection provides a closure batten having a substantially T-shaped cross section defined by a cross flange and a leg flange. The leg flange is adapted for insertion between adjacent edges of two panels while the cross flange provides a neat closure over the joint. The closure batten cooperates with a pair of flexible locking flanges mounted on the edges of both panels to affect a seal and retain the foamed-in-place material as the foaming process is carried out.

One object of the present invention, therefore, is to provide an improved panel structure having a transparent rail extending along at least one edge and which provides means for observing the foaming process.

Another object is to provide insulated panels of the kind described which may be economically manufactured without the need of special tools or equipment as commonly required for breaking the bond between the foamed-in-place material and conventional side retainer plates.

A still further object of this invention is to provide connections for joining two insulated panels edge-to-edge with a foamed-in-place joint which is both neat in appearance and without voids.

Other objects of this invention will become apparent in view of the following detailed description and the accompanying drawing.

Figure 2:
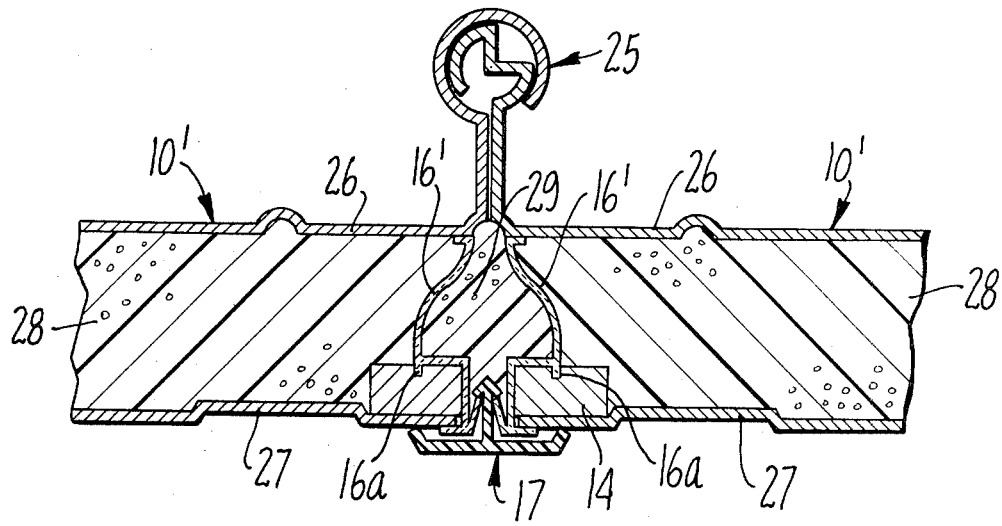
Figure 3:
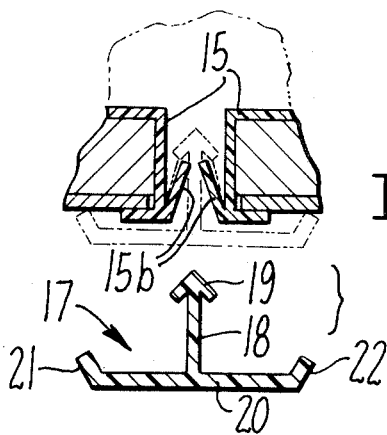

In the drawings forming a part of this application and in which like parts are identified by the like reference numerals throughout the same, FIG. 1 is a cross section of portions of a pair of panels joined together in a preferred manner contemplated by this invention;

FIG. 2 is a cross section of a second embodiment of the invention in a connection of two insulated panels; and FIG. 3 is a detail drawing of the locking batten illustrating the manner in which the batten cooperates with the edges of two juxtaposed panels.

Referring to FIG. 1 there is illustrated a pair of panels 10 joined together by a foamed-in-place connection generally indicated by reference number 11. Panels 10 each comprise a pair of skins 12 separated by a thermal barrier 13 of foamed-in-place insulating material, such as polyurethane. The edges of each panel 10 are defined by a pair of rigid members 14, one member being secured to each skin 12. Plastic molding strips 15 cover the exterior surfaces of strips 14 and overlap the exterior surface of skins 12. Each molding is formed with a flange 15a that is received in a groove of strip 14, thereby mounting the molding to the strip. This mounting attachment is also capable of resisting the outward pressure exerted by the foamed-in-place insulating material 13 during formation of the panels. A transparent rail 16, which may be made of a clear, vinyl plastic material, forms a barrier intermediate each pair of rigid members 14. The edges of rails 16 abut against the end flanges 15a of plastic edge moldings 15.

Each plastic edge molding 15 is also formed with an integral locking flange 15b that extends from a point near the edge of each skin 12 outwardly relative to the panel edge and inwardly towards the center of the panels and the cavity therebetween. Flanges 15b cooperate with a closure batten 17 in the manner which is hereinafter described.

In the process of forming panels 10, rigid members 14 are secured to opposite skins 12; plastic moldings 15 are mounted to rigid members 14; and the clear plastic rail 16 is positioned between rigid members 14 and in abutment with the flanges 15a of the plastic moldings. This assembly is then maintained in a mold while the foamed-in-place insulating material 13 is introduced between skins 12. In a preferred method the insulating material is inserted by means of a probe inserted through holes drilled through the clear plastic rails 16; and, as the foaming material is deposited between the skins, the filling process is observed through rail 16 to insure that there are no voids. The clear vinyl rail 16 also resists the outward pressure of the foam and becomes an integral part of the panel assembly. Any voids which may occur are immediately detected and such voids can then be corrected prior to the removal of the panel from the mold.

A pair of panels 10, as described above, may be joined together with foamed-in-place material with the aid of a pair of closure battens 17 which may be formed of an inexpensive plastic material. Referring to FIG. 3 in particular, each batten 17 generally comprises a leg flange 18 that terminates in an enlarged ridge 19. The cross section of the ridge has the appearance of an arrowhead and provides shoulders that engage the ends of locking flanges 15b when the batten is installed as shown in FIG. 1.

Battens 17 also comprises a cross flange 20 having parallel edges 21 and 22 extending at an angle toward the exterior surfaces of adjacent panels. The resiliency of the plastic material from which battens 17 are formed allow flanges 21 and 22 to be flexed upon inserting the leg flange 18 into a position between the edges of panels 10 where the locking flanges 15b fall behind the shoulders of ridge 19. Thereafter the resiliency of the material causes the battens to move slightly outward relative to the joint between panels. In this condition of assembly foamed-in-place insulating material 23 is introduced between panels and into the cavity defined by clear plastic rails 16, plastic moldings 15 and the ridges 19. The pressure of the foaming process will be applied against ridges 19 of both upper and lower battens, thereby forcing the ridges against the ends of locking flanges 15b and affecting a more positive seal. The foamed-in-place material may be injected into the cavity between rails 16 by means of a probe introduced at one end of the joint, and this is best accomplished by first inserting the probe entirely through the cavity before introducing any of the foamed-in-place material. Then the probe is retracted along the joint as the foamed-in-place materials is injected.

FIG. 2 of the drawing illustrates a second embodiment in a connection for two insulated panels of the kind described. More particularly, this embodiment comprises a pair of panels 10' interconnected by a joint 11'. Panels 10' are formed in substantially the same manner as panels 10 as described in connection with the first embodiment. However, one skin of each panel 10' is mechanically joined by what is known as "Zip-Rib" closure assembly, indicated generally by the reference number 25. Details of closure assembly 25 are of a known type and form no part of the present invention.

Each panel 10' comprises a pair of skins 26 and 27 separated by foamed-in-place insulating material 28. Skins 26 are integrally formed with fittings which compliment one another to form closure assembly 25. Skins 27, on the other hand, are joined with a closure batten 17 as described in connection with the embodiment of FIG. 1. Panels 10' differ from panels 10 in that a transparent rail 16' extends across the entire edge between skins 26 and 27, each rail 16' being provided as an integral extension to a plastic molding secured to rigid members 14. The upper end of rails 16', as shown, contact the inside surface of skins 26 and are mechanically held in place when panels 10' are being formed. But the lower edge of each rail is mounted to a rigid member 14 in essentially the same manner as edge molding 15 of the first embodiment. For this purpose each clear, plastic rail 16' is formed with a depending flange 16a that fits in a groove of rigid member 14.

The cavity between rails 16' is filled with foamed-in-place material 29 in the same manner as described above in connection with the embodiment of FIG. 1. This occurs after the leg flange 18 of closure batten 17 has been mounted between panel edges.

What I claim is:

1. A connection for joining two insulated panels in edge-to-edge relation, both panels having recessed edges, the recess of one edge being generally opposite the recess of the other and defining a continuous cavity therebetween, means mounted on the edge of each panel to provide a flexible locking flange that extends inwardly toward its cavity, a closure member having a substantially T-shaped cross section defined by a leg flange and a cross flange, said leg flange extending between the flexible locking flanges while the cross flange spans the joint and overlaps the edges of said two panels, and foamed-in-place material filling the cavity between said panels pressing the flexible locking flanges against the leg flange of the closure member.

2. The panel connection of claim 1, the leg flange of said closure member being formed with shoulders located at a distance from said flange as to engage the ends of said resilient locking flanges when said cross flange is positioned in contact or near contact with the exterior of each panel, the pressure of said foamed-in-place material placing the shoulders in contact with the ends of said resilient locking flanges and providing an even tighter seal as the pressure of the foaming process increases.

3. The panel connection of claim 2, the cross flange having parallel edges extending toward the skins of said panels and engageable therewith, said edges being resilient to bias the cross flange away from the panels while allowing the shoulders to be positioned within the cavity in back of said locking flanges.